(12) United States Patent
Rodriguez et al.

(10) Patent No.: US 11,032,089 B2
(45) Date of Patent: Jun. 8, 2021

(54) METHOD AND SYSTEM FOR MANAGING POWER DELIVERY AND FIXTURE OPERATION FOR POWER OVER ETHERNET SYSTEMS

(71) Applicant: LV Energy Systems, LLC, Las Vegas, NV (US)

(72) Inventors: Jesus Rodriguez, Brick Township, NJ (US); Egidio Enea, Howell, NJ (US); Sergio DeAlmeida, Brick Township, NJ (US)

( * ) Notice: Subject to any disclaimer, the term of this patent is extended or adjusted under 35 U.S.C. 154(b) by 0 days.

(21) Appl. No.: 16/892,768

(22) Filed: Jun. 4, 2020

(65) Prior Publication Data

US 2021/0111910 A1 Apr. 15, 2021

Related U.S. Application Data

(60) Provisional application No. 62/912,695, filed on Oct. 9, 2019.

(51) Int. Cl.
| | |
|---|---|
| *H04L 12/10* | (2006.01) |
| *H04L 12/40* | (2006.01) |
| *H05B 47/18* | (2020.01) |
| *G06F 1/26* | (2006.01) |

(52) U.S. Cl.
CPC ............ *H04L 12/10* (2013.01); *G06F 1/266* (2013.01); *H04L 12/40045* (2013.01); *H05B 47/18* (2020.01)

(58) Field of Classification Search
CPC ... H04L 12/10; H04L 12/40045; G06F 1/266; H05B 47/18
See application file for complete search history.

(56) References Cited

U.S. PATENT DOCUMENTS

| | | | |
|---|---|---|---|
| 10,332,383 B1* | 6/2019 | Giles | G08B 7/06 |
| 2008/0197790 A1* | 8/2008 | Mangiaracina | F21V 23/04 |
| | | | 315/312 |
| 2014/0204954 A1* | 7/2014 | Nee | H04L 45/302 |
| | | | 370/401 |
| 2016/0212828 A1* | 7/2016 | Leinen | H05B 47/18 |
| 2018/0139823 A1* | 5/2018 | Hick | H04L 12/10 |

* cited by examiner

*Primary Examiner* — Terrell S Johnson
(74) *Attorney, Agent, or Firm* — Andrew Morabito

(57) ABSTRACT

The present invention is a system for providing power and controlling a plurality of ethernet devices, comprising: a driver, wherein the driver provides for the control of the system; a plurality of sensors, wherein the plurality of sensors collect sensor specific data and are in communication with the driver; a Power over Ethernet (POE) switch, wherein the POE switch is in communication with the plurality of sensors; a plurality of fixtures in communication with the driver and the POE switch, wherein the plurality of fixtures are light sources; and a local power source, wherein the local power source is in communication with the POE switch.

11 Claims, 5 Drawing Sheets

METHOD AND SYSTEM FOR MANAGING POWER DELIVERY AND FIXTURE OPERATION FOR POWER OVER ETHERNET SYSTEMS

CROSS-REFERENCE TO RELATED APPLICATIONS

This application is a continuation-in-part (and claims the benefit of priority under 35 USC 120) of U.S. application No. 62/912,695 filed Oct. 9, 2019. The disclosure of the prior applications is considered part of (and is incorporated by reference in) the disclosure of this application.

BACKGROUND

This disclosure relates generally a power over Ethernet (PoE) system, and particularly to the PoE system and the method of operation of the PoE system.

Presently, many buildings have complicated electrical wiring systems that are installed when the building is first built. These wiring systems are typically required to be installed by a certified electrician, and the placement of overhead lighting and electrical outlets is predetermined by the wiring system that is pre-installed in the building. After the building is built, adding or moving light fixtures may be complicated and costly, requiring substantial re-wiring by an electrician.

Each light in a building may also be connected to a light switch module that is used for turning it on and off. The placement of this switch is also pre-determined by the electrical wiring system when the building is first built. Moving the placement of the light switch modules or altering the control of the switch later typically also requires an electrician to re-wire the relevant portion of the house, which can be very complicated and costly.

These existing electrical distribution systems are typically high voltage (100-250V) AC (alternating current). Newer lighting technologies, like LED (light-emitting diode) lights, are more efficient than incandescent and even fluorescent lighting. However, they are inherently low voltage DC (direct current) driven devices. Adapting these devices to work in an existing AC distribution system requires conversion of the power sources, resulting in additional costs and complications.

Power over Ethernet (PoE) is a technology for supplying low voltage current and data over a common point-to-point Ethernet network cable to locations with applications that require both mediums. In some cases power is carried on the same conductors that carry data. In other cases power is carried on dedicated conductors within the same cable. Applications that currently benefit from PoE technology include Voice over Internet Protocol (VoIP), IP cameras, wireless local area networks (WLAN), Wireless Access Points, Building Automation Systems (BAS), and security and access control systems.

PoE has several advantages over traditional power systems used in homes and commercial buildings. For example, PoE systems are relatively low voltage, thus eliminating the need to run expensive high voltage wiring and conduit for lighting. In addition, installation of PoE wiring can be faster than with traditional power systems because Ethernet cabling employs simple plug-in end connections. Where Ethernet cabling is already in place (i.e., for data transmission), PoE functionality can be achieved without the need for additional wiring installation.

With the increase in power provided by modern PoE systems, it would be desirable to provide a PoE system capable of controlling and powering a variety of light emitting diode (LED) lighting system components. The system should be inexpensive, easy to install, and easy to configure and control. The system should also be able to power and/or control other low voltage devices, such as occupancy sensors, photodetectors, wall switches and the like.

The power over Ethernet devices do not require separate power supply lines. In some instances, the power may be supplied by a power supply contained within an Ethernet switch or within the system. Due to this, the power supply does not generally have the power capability to supply maximum power to every port, there is a limit on the number of power over Ethernet devices that can be connected to a given power supply. A port may be denied power, if it will result in oversubscription of the power supply. Example power over Ethernet devices that can benefit from receiving power over the Ethernet communication lines include an internet protocol telephone, a badge reader, a wireless access point, a video camera, and others.

Traditionally, when a power over Ethernet device is connected to a power supply, the power over Ethernet device is allocated a maximum power class. These maximum values correspond to the maximum amount of power that will be supplied by the power supply to the power over Ethernet device.

Therefore, it is desired for a PoE system that provides for ease of installation within the building, simplification of the integration of new fixtures, and a user friendly experience to control and use the PoE system.

SUMMARY

In a first embodiment, the present invention is a system for providing power and controlling a plurality of ethernet devices, comprising: a driver, wherein the driver provides for the control of the system; a plurality of sensors, wherein the plurality of sensors collect sensor specific data and are in communication with the driver; a Power over Ethernet (POE) switch, wherein the POE switch is in communication with the plurality of sensors; a plurality of fixtures in communication with the driver and the POE switch, wherein the plurality of fixtures are light sources; and a local power source, wherein the local power source is in communication with the POE switch.

In a second embodiment, the present invention is a method of controlling a fixture in a power over ethernet (POE) system, the method comprising: a driver receiving a power and a control signal from at least one fixtures; a control module processing the received power and the received control signal, wherein the control module determines if the at least one fixtures are operating with a predetermined range; the control module signaling the driver to adjust the power signal for the at least one fixtures.

In a third embodiment, the present invention is a method of operating a Power over Ethernet (POE) system, the method comprising: a driver, wherein the driver has a control module; a POE switch in wired communication with the driver; a plurality of sensors in wired communication with the POE switch; a plurality of fixtures in wired communication with the driver and the POE switch; a power source in wired communication with the POE switch, and wherein the control module processes a first set of data received by the plurality of sensors and the plurality of fixtures, and generates a set of actions which are sent from the driver to the POE switch, wherein the POE switch sends power only via the wired connection.

BRIEF DESCRIPTION OF THE DRAWINGS

Referring now to the drawings in which like reference numbers represent corresponding parts throughout.

DETAILED DESCRIPTION

Figure 1:
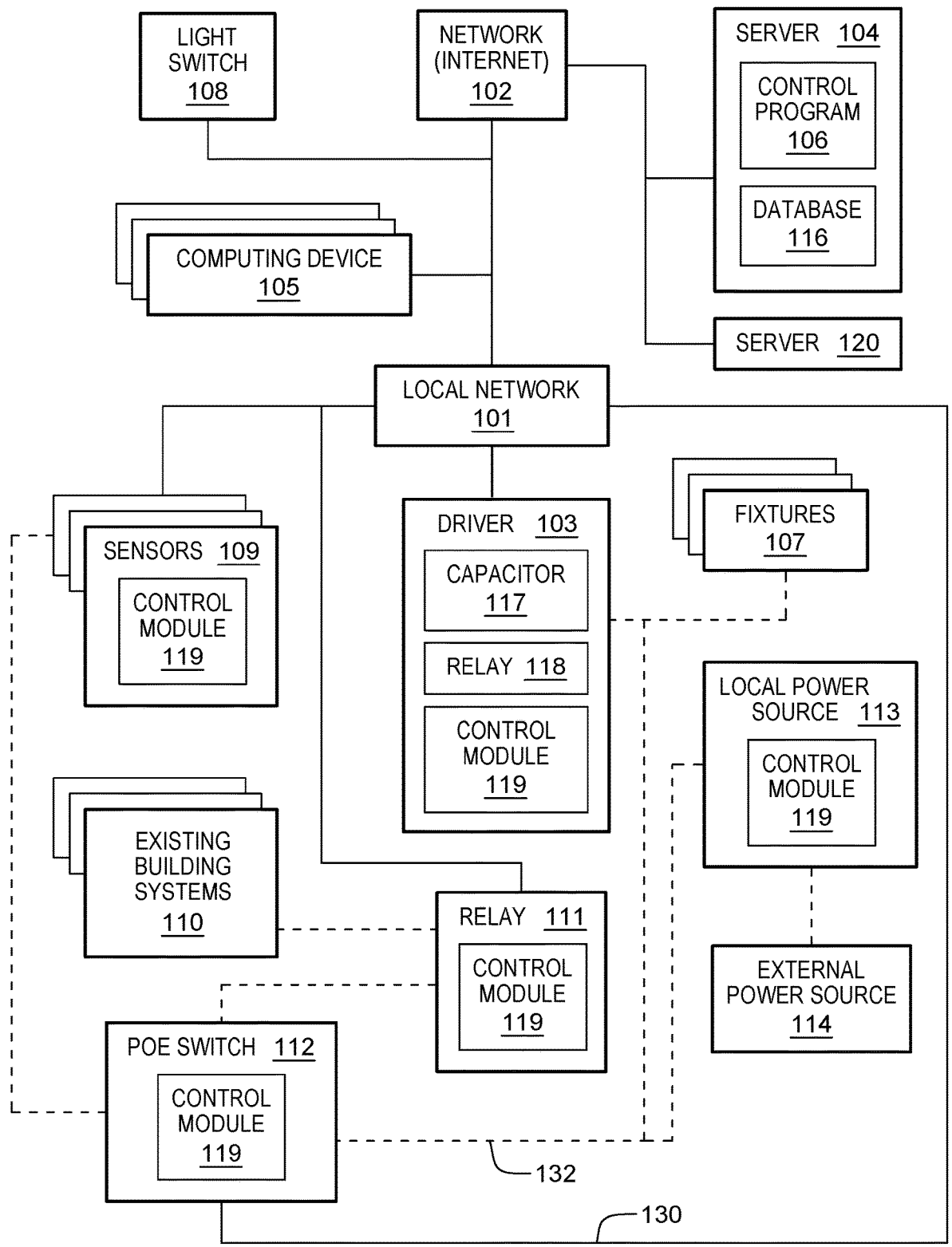
FIG. 1 depicts a block diagram depicting a PoE environment, according to an embodiment of the present invention.

The present invention generally relates to PoE systems and provides several advantages over the present designs. The present PoE lighting system is unique in that it is an entire systems and not a component requiring the integration of at least one other system. Unlike other manufacturers of lighting technology systems that rely on other vendors for individual components to make up there lights/fixtures, the present PoE system uses all internal components. The present PoE system improves communication by using a predominately wireless system design. The elimination of the light controller, and the use of a cloud based management system, the PoE system increases efficiency, reduces costs, and improves the versatility of the system. The system further eliminates the gateway/driver combo and only require the use of one driver. The gateway is used as a power distribution and network connected module to power the fixtures. The present invention removes the necessity of this element and further simplifies the PoE system. With the integration of the cloud based system, the need for physical light switches is removed and thus increases the number of fixtures which can be integrated into the PoE system. As in the past the requirement of light switches limits the number of fixtures which can be integrated into the PoE system. Through the use of wireless controller, the present PoE system can manage 1 or 10,000 fixtures. The requirement of the need for a power cable to connect the sensors has been removed, providing a massive increase in the versatility of the system by allowing for the sensors to be placed virtually anywhere provided they are in wireless communication with the driver.

The system does not require an additional power supply to power downstream devices such as but not limited to wall switch, motion sensors, etc. The system does not require a wall switch to be physically connected to turn the led on or off. The system does not require an in-room controller to manage connectivity to light switches, motion sensors etc. the system is able to manage all auxiliary devices via a wi-fi connection. Additionally, the system is not limited to the number of fixtures or location of fixtures it can simultaneously control. The system is able to manage and control an unlimited number of devices via the wi-fi controller. Unlike other systems that use slave controllers to manage downstream devices thus making them inherently fault intolerant our system does not have any such limitation and if one device on the network fails only said devices fails and all other devices on the network remain operational. Existing systems require the use of costly site control servers to manage the operation of each light fixture, our system embeds control software in each wi-fi chip that connects directly to a cloud server eliminating the need for a costly onsite control server.

The PoE lighting systems is powered by a network switch using power over ethernet technology. The system is able to reduce energy consumption by up to 80% over traditional fluorescent lighting and 50% over standard high voltage LED lighting. Additionally, the present system can be used as a full time system or an emergency lighting system. The system is also intelligent lighting as it is managed by a cloud server allowing for the management of each fixture or a group of fixtures. There is no need for an in-house lighting controller, there is also redundancy built into the system in the case of an internet outage. The system uses wireless technology for data communication allowing for a more efficient communication method that does not suffer from traditional emf interference that is experience when higher than normal voltage is run through bundled communication cabling.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 depicts a block diagram of a PoE environment 100 in accordance with one embodiment of the present invention. FIG. 1 provides an illustration of one embodiment and does not imply any limitations regarding the environment in which different embodiments may be implemented.

In the depicted embodiment, PoE environment 100 includes local network 101, network 102, server 104, computing devices 105, driver 106, fixtures 107, light switches 108, multi-sensors 109, alarms/existing building systems 110, relay 111, PoE Switch 112, local power source 113, external power source 114, and server 120. PoE environment 100 may include additional servers, computers, or other devices not shown.

The local network 101 may be a local area network (LAN), a wide area network (WAN) such as the Internet, any combination thereof, or any combination of connections and protocols that can support communications between computing device 105, and server 104 in accordance with embodiments of the invention. Network 102 may include wired, wireless, or fiber optic connections. In the depicted embodiment, the local network 101 connects computing devices 105, driver 106, light switches 108, multi-sensors 109, relay 111, and PoE Switch 112.

The network 102 may be a local area network (LAN), a wide area network (WAN) such as the Internet, any combination thereof, or any combination of connections and protocols that can support communications between computing device 105, and server 104 in accordance with embodiments of the invention. Network 102 may include wired, wireless, or fiber optic connections. In the depicted embodiment, the network 102 connects servers 104 and 120 with the local network 101.

The server 104 may be a management server, a web server, or any other electronic device or computing system capable of processing program instructions and receiving and sending data. In other embodiments server 104 may be a laptop computer, tablet computer, netbook computer, personal computer (PC), a desktop computer, or any programmable electronic device capable of communicating via network 102. In one embodiment, server 104 may be a server computing system utilizing multiple computers as a server system, such as in a cloud computing environment. In one embodiment, server 104 represents a computing system utilizing clustered computers and components to act as a single pool of seamless resources. In the depicted embodiment database 108 and control program 106 are located on server 104. Server 104 may include components, as depicted and described in further detail with respect to FIG. 3. In some embodiments, server 104 is a cloud service platform or a web service cloud-based service platform.

Control program 106 controls the operations of the fixtures 107 based on the data received and processed from the sensors 109, existing building systems 110, light switches 108, and the like. In the depicted embodiment, Control program 106 utilizes network 102 and network 101 to access the driver 103 and the relay 111, PoE Switch 112, and sensors 109. In the depicted embodiment, Control program 106 resides on server 104. In other embodiments, Control program 106 may be located on another server or computing device, provided Control program 106 has access to database 108, driver 103 and the relay 111, PoE Switch 112, and sensors 109. The control program 106 is able to set features such as, but not limited to circadian rhythm, and timers.

Database 116 may be a repository that may be written to and/or read by control program 106. In one embodiment, database 108 is a database management system (DBMS) used to allow the definition, creation, querying, update, and administration of a database(s). In the depicted embodiment, database 116 resides on server 104. In other embodiments, database 108 resides on another server, or another computing device, provided that database 108 is accessible to Control program 106.

The computing device(s) 105 may be a management server, a web server, or any other electronic device or computing system capable of processing program instructions and receiving and sending data. In some embodiments, computing device 105 may be a laptop computer, tablet computer, netbook computer, personal computer (PC), a desktop computer, or any programmable electronic device capable of communicating with computing device 105 and server 104 via network 102. In other embodiments, computing device 105 may represent a server computing system utilizing multiple computers as a server system, such as in a cloud computing environment. In another embodiment, computing device 105 represents a computing system utilizing clustered computers and components to act as a single pool of seamless resources. In embodiments, computing device 105 may include any combination of Control program 106 or database 108. Computing device 105 may include components, as depicted and described in further detail with respect to FIG. 3. In the depicted embodiment the computing device 105 is connected to the local area network 101 through a wireless 130 connection. In other embodiments, the computing device 105 may be connected to the local area network 101 and other components of the system through wired or wireless connections.

The driver 103 allows for the powering of fixtures 107 and communicating with the sensors 109 and switches 108. The driver 103 has been built with a special capacitor 117 to allow for a charge to be maintained allowing the fixture(s) 107 to turn on without the customary led light delay. Additionally, the driver 103 has an embedded wireless component that allows for the control program 106 to communicate directly with the driver 103. In some embodiments, the wireless component acts as a gateway to allow for direct communication to the networks 101 and 102, eliminating the need for an in house lighting control system. Within the driver 103 is a self-contained wireless network that allows for the use of a computing device 105 to be used in the event of an internet outage.

The driver 103 has a wireless component provides for the wireless communication with network 101 and communication with the PoE switch 112 and the fixtures 107. The driver 103 has a different mac address for wireless communication over a secure wireless network. The PoE interface embeds two active bridges and the driving circuitry, a charge pump to drive high-side MOSFETs, the hot swap MOSFET, and the standard single-signature IEEE 802.3bt-compliant interface, including detection, classification, UVLO, and inrush current limitation. In some embodiments, the driver 103 is capable of handling power up to 48-W output with high efficiency, good current regulation, low standby consumption, and low current ripple.

On powering up the driver 103, the power is provided directly through the POE switch 112. In some embodiments, this is through a UPoe (802.3 bt) switch.

The driver 103 has a built in control module 119 for the transmitting, receiving, and process of data and provides the driver with the ability to communicate with the other control modules 119 within the system 100.

The fixtures 107 turn ON with maximum brightness. The dimming, temperature control and ON/OFF of the fixtures 107 can be controlled by using a switch 108 or a computing device 105 through the control program 106. The control program 106 communicates with the networks 101 and 102. The driver provides for the control of the fixtures 107. For example the ON/OFF of the fixtures 107 is controlled by clicking on the on and off icon, and the brightness of the fixtures 107 can be changed by adjusting the slide bar icon and changing the color temperature is done by choosing the color temperature range programmed for each individual light fixture. Based on the selected dimming level, the driver 103 adjusts the duty cycle signal going to the fixture 107. In some embodiments, the frequency of the PWM to the driver 103 is 500 Hz. In some embodiments the fixtures 107 are doors, door switches, windows, window locks, security systems, and other fixtures which are part of buildings or structures which can be controlled through electronic means.

The overall efficiency, current regulation, and dimming behavior of the driver 103 has been evaluated at different loads. With 100% load at 48 VDC, the efficiency is above 95%, the driver 103 performance in terms of dimming behavior, current regulation, and efficiency. The standby power consumption is less than 100 mW.

The present driver 103 does not require a physical switch to control the fixtures 107. Nor does the driver 103 require a hardwired switch 108 to function or operate. The current invention does not require slave configuration for operation of down stream fixtures.

The relay 118 may be integrated into the driver 103 to provide another approach involves self-contained battery pack emergency light. The relay 118 is connected to normal power, which provides a constant charging current for the battery. During a power failure, the relay 118 energizes the emergency fixtures.

In one embodiment, the driver 103 allows for a constant-current smart driver capable of working on Ethernet RJ-45 cable for delivery of power only and wirelessly controlled through Wi-Fi at 2.4 ghz. The power supply for the LED driver is capable of operating from 37- to 57-V input DC voltage, with a maximum power output of 48 W. The board features digital/PWM dimming, with the depth of PWM dimming close to 1%. The smart dimming and ON/OFF of the LEDs, color temperature controls, timer control functionality is controlled through an onboard control module. The driver 103 provides for the standby power (no load) consumption. The driver's converter efficiency reaches 95% for most of the input voltage range. All protection features like LED open and short are present in the developed solution.

In some embodiments, the driver 103 has a power controller, which is used for driving the fixtures 107 in constant-current mode. Due to the high-frequency operation of the power controller. The power controller has a DIM pin for digital dimming and an EN pin for implementing driver ON and OFF. The power controller has a built-in protection mechanism to manage faults both at source and load side.

The fixture(s) 107 are the various light fixtures or light sources integrated into the system. These fixtures can be a variety of Light Emitting Diode (LED) lights or the like. For example, 2×2 LED panels, T-bar lights, water sealed LED light bars, linear pendant lights, linear ambient lighting systems, troffer lights, wall pack fixtures, recessed lighting fixtures, and these may be flush or suspended fixtures. In the depicted embodiment, the fixtures 107 are wired to the driver 103. The direct connection within the environment 100 may be a category 6A U/UTP CMP/CMR cable or the like which is able to meet the power and signal requirements of the driver 106. This provides for the PoE connection to provide both power and control signals from the driver 103 to the fixtures 107. In some embodiments, the fixtures 107 may be in direct contact with a power source 111 (e.g. battery, solar panel, municipal power, or the like) through a relay which controls the power supplied from the power source 111 to the fixture 107. In some embodiments, the fixtures 107 are light-emitting diode (LED), the LEDs are activated and turn on quickly and can be readily dimmed. LEDs emit a cool light with very little infrared light. An LED circuit will approach 80% efficiency, which means 80% of the electrical energy is converted to light energy; the remaining 20% is lost as heat energy.

The light switch(es) 108 are used to provide manual operation and control of the fixtures 107. The light switches 108 are either hardwired into the system or, based on more recent technology may be able to be wirelessly connected to the local area network 101. The light switches 108 may have various features such as dimming, time controlled, or other features to activate, deactivate the fixtures 107. In the depicted embodiment, the light switches 108 are connected to the local area network 101 through a wireless connection. In other embodiments, the light switches 108 may be hardwired into the system 100.

The sensor(s) 109 are used to provide the data collection for the driver 103 to determine if the requirements have been met to activate or alter the fixtures 107. The sensors 109 may also be a multi sensor, that allows for the detection of motion, daylight, heat, temperature and humidity using a wireless component that has been built into the sensors 109 to allow for direct communication to the control module. In some embodiments, the sensors 109 are simple light switches as currently designed. The use of the motion sensor will allow for the light to be turned on when it detects motion or in the event that an individual is in an office at his desk but not moving enough to trip the motion sensor it will detect the individuals body heat and activate the lights. The daylight sensor 109 will allow for the integration of daylight harvesting and a circadian rhythm setting to maximize the efficiency of the systems. The sensor 109 is self contains as it does not require a power cable and runs off of battery power. In another embodiments, the sensor 109 may be hardwired and connected to power via the PoE switch. The sensors 109 have a built in control module 119 for transmitting data with regards to the data received from the sensors 109, as well as process the requests sent to the sensors 109 from various elements of the system 100. In some embodiments, the sensors 109 may be able to detect various chemicals, gases, or the like. The sensors 109 are replaceable and adjustable based on the building requirements for both safety and security. The sensors 109 can be integrated into the system provided they are able to communicate with the driver 103 and/or the POE switch 112.

The existing building systems 110 may also include fire or burglary components or systems integrated into the building which are connected to the system, such that when these building systems 110 are activated, the driver 103 provides a response action from or to the fixtures 107. The fire alarm interface, that will enable any number of pre-determined scenes to be activated in the event that the fire alarm at the facility is triggered. The system 110 can be set to turn all facility lights to max power allowing for the safe evacuation of tenants and guests. The burglar alarm interface that will enable any number of pre-determined scenes to be activated in the event that the burglar alarm at the facility is triggered. The system 110 can be set to turn all facility lights to max power allowing in an effort to thwart any wood be criminals and to enable the safety conditions for security and or police additionally the motion sensor can be used to trigger the recording feature of any security cameras in the vicinity.

The relay 111 is a PoE operated switch which controls the communication between the PoE switch 112 and the existing building systems 110. The relay 111 have a built in control module 119 for the transmitting, receiving, and process of data and requests and permits the relay 111 to perform the desired action based on the data.

The Power over Ethernet (PoE) Switch 112 supplying power and data through a standard Ethernet cable is commonly called "Power-over-Ethernet," or PoE technology which has an industry standard protocol called IEEE 802.3af. An embodiment of the present invention supports the IEEE 802.3af standard as well as a customized, novel PoE architecture which allows a user to select a multiple number of desired voltages and current levels for an output PoE port by instructing a microprocessor using an output voltage-adjusting interface. PoE currently has two standards: Institute of Electrical and Electronics Engineers (IEEE) 802.3af (the original PoE standard) and IEEE 802.3at (known as PoE plus), which provide, respectively, about 13 Watts and about 25.5 Watts of power to connected devices. In addition, a new standard is being developed that is intended to provide upwards of 50 Watts of power to connected devices. The switch 112 have a built in control module 119 for the transmitting, receiving, and process of data and requests and permits the switch 112 to perform the desired action based on the data.

In some embodiments, the driver 103 derives its power from the PoE switch 112. In some embodiments, the PoE switch 112 is an IEEE 802.3BT PoE switch and is only used for delivering power to the driver 103 but is not used for communication to the driver 103 in an effort to avoid any EMI communication disruption due to the higher than normal power.

The local power source 113 is an uninterruptible power supply that provides constant and continuous power to the system with minimal disruptions in the power supply. Both in an emergency or on a regular basis the local power source 113 may be used. The local power source 113 is connected to the external power source 114 and may be a passthrough device for the power supply, or may be charged by the external power source. 114. In one embodiment the local power source 113 provides for 3000 watts for every three switches 112 allowing for the use of up to 75 fixtures 107 during a power outage at full power the light will remain functional on battery power for 120 minutes. At half power we can extend the battery life and allowing for the lights to stay on for 240 minutes. The local power source 113 also has a built in control module 119 to allow communication with the other control modules 119, the driver 103, and the control program 106. The control module 119 transmits data with regards to grid power levels, battery life, battery charge levels and charge rate. This information is used to determine whether the battery is on grid or battery power to allow the system to determine if the emergency lighting scenario needs to be implemented. The battery along with the control module 119 allows for an independent control of a lighting system.

The external power source 114 may be various forms of renewable energy such as solar, wind, water, or the like forms of energy. In some embodiments, the external power source 114 is an established power system or structure, for example, city or municipal provided power.

The server 120 may be a management server, a web server, or any other electronic device or computing system capable of processing program instructions and receiving and sending data. In other embodiments server 120 may be a laptop computer, tablet computer, netbook computer, personal computer (PC), a desktop computer, or any programmable electronic device capable of communicating via network 102. In one embodiment, server 120 may be a server computing system utilizing multiple computers as a server system, such as in a cloud computing environment. In one embodiment, server 120 represents a computing system utilizing clustered computers and components to act as a single pool of seamless resources. In the depicted embodiment database 108 is located on server 120. Server 120 may include components, as depicted and described in further detail with respect to FIG. 3. Server 120 would be a lightweight publish and subscribe system where you can publish and receive messages as a client. MQTT Server 120 is a messaging protocol, designed for constrained devices with low-bandwidth.

Figure 2:
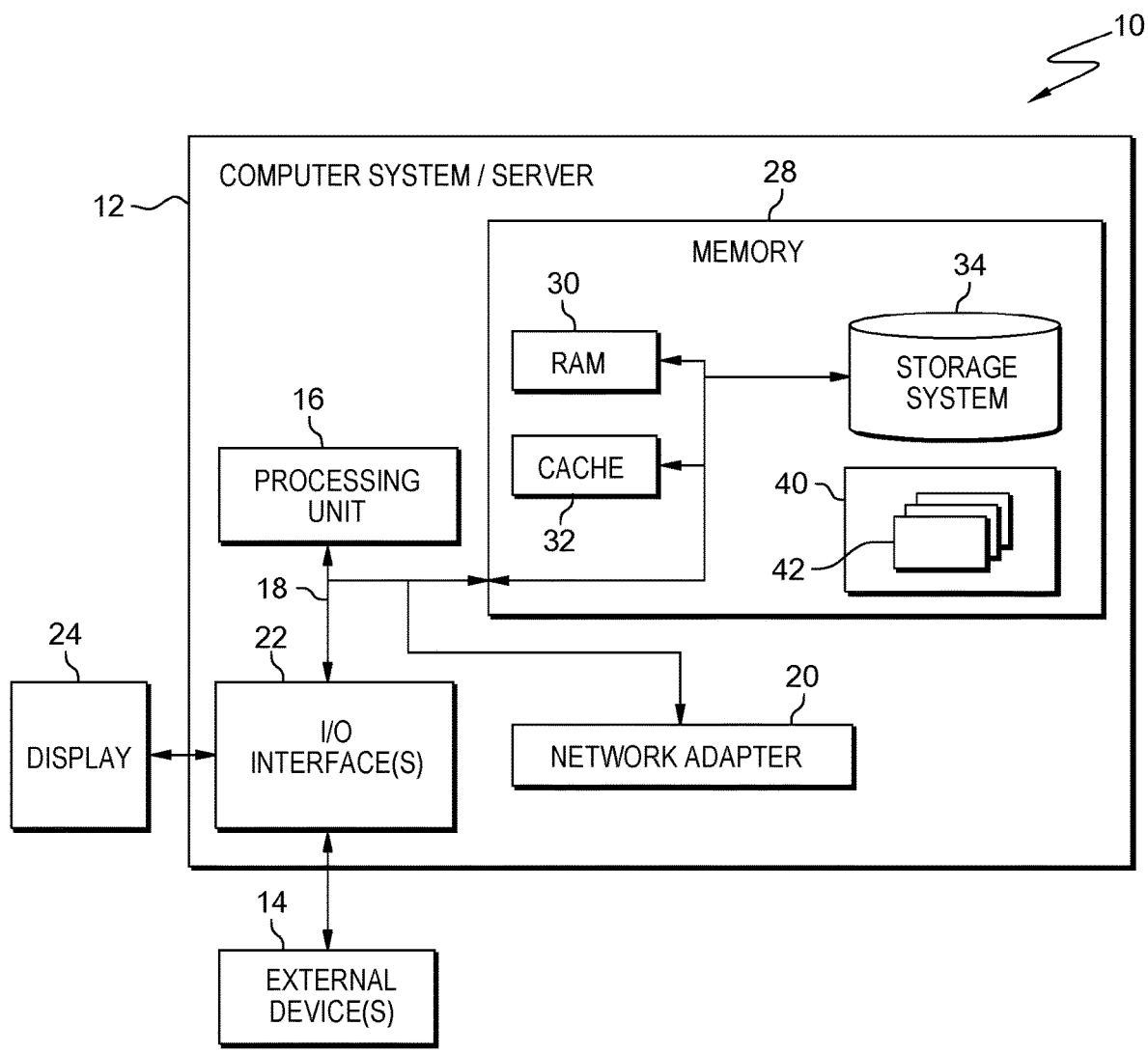
FIG. 2 depicts a computing node, according to an embodiment of the present invention.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
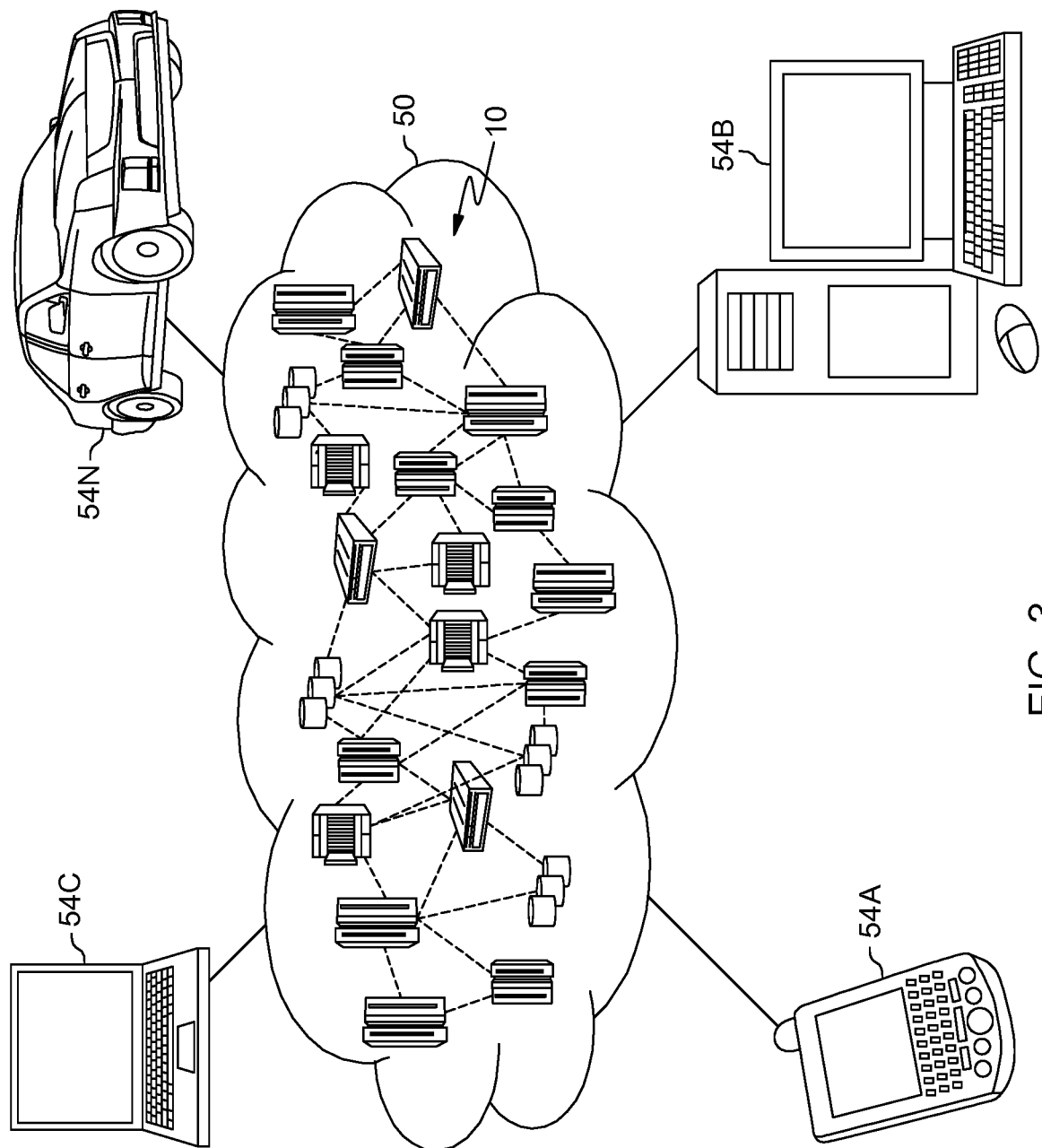
FIG. 3 depicts a cloud computing environment, according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and laptop computer 54C may communicate. Nodes 10 may communicate with one another. They may be grouped (e.g. array) (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 3 are intended to be illustrative only and that computing nodes 10 and cloud computing environment 50 can communicate with any type of computerized device over any type of network and/or network addressable connection (e.g., using a web browser).

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
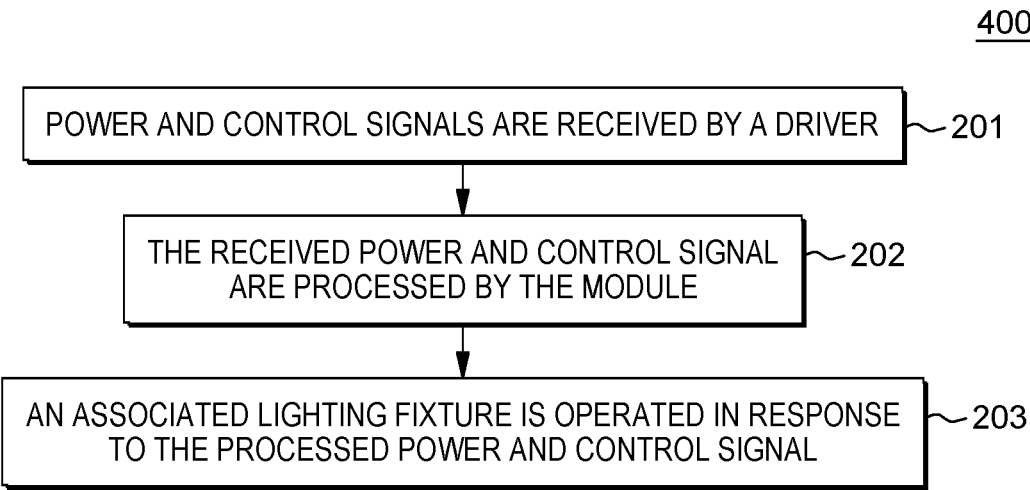
FIG. 4 depicts a flowchart of the operational steps of an exemplary method of operating the disclosed PoE system within the PoE environment of FIG. 1, according to an embodiment of the present invention.

FIG. 4 shows flowchart 400 depicting a method according to the present invention. The method(s) and associated process(es) are now discussed, over the course of the following paragraphs, in accordance with one embodiment of the present invention. Additionally, steps of the method 600 may be performed in varying orders or concurrently. Furthermore, various steps may be added, subtracted, or combined in the method 600 and still fall within the scope of the present disclosure.

A method 400 to operate the fixtures 105 is described. In step 201, the driver 103 receives the power from the PoE Switch and the control signal over the wireless network 105, for the groups or arrays of fixtures 105, or a combination of the two. The received power and control signal are associated with the fixture power usage, power requirements, control settings, sensor data, and the like. In step 202, the control program 106 analyzes the data collected by the driver 103 to determine if the fixture(s) 15 are operating within the set requirements or parameters set forth by the user or the system, and are within the program requirements. The program may be normal operation, emergency, low power consumption or the like. In step 203, the control program 106 communicates with the driver 103 to control the operation of the respective fixture 105 based on the processed power and control signal 105, through the wired connection between the driver 103 and the fixture 105 the driver is able to maintain or alter the power supplied to the fixture 105, control the fixture 105 to act in a predetermined manner is managed over the wireless network (e.g. on, off, or dim).

The power and control signal processing is typically interrupted by the sensors 109, where a request to turn on, turn off, or dim the fixture is requested. In some embodiments, the driver 103 controls the temperature of the fixtures 105 which relate to the light output of the fixture. In additional embodiments, the interruption may come from the alteration or instability of the incoming power supply, and various other factors which can occur to the fixtures 105. For instance if a fixture experiences an error or malfunction, the driver may receive information related to the malfunction and cut power to the fixture 105 to stop further damage and provide a notice to the control program 106 which communicates with the computing device 103 for the required personnel to investigate the malfunction. Similar for the sensors 109 if one is providing inaccurate or inconsistence control signals. In some embodiments, the control signals are conditioned and provided to the driver 103. The conditioning may be due to the relay or capacitor.

Figure 5:
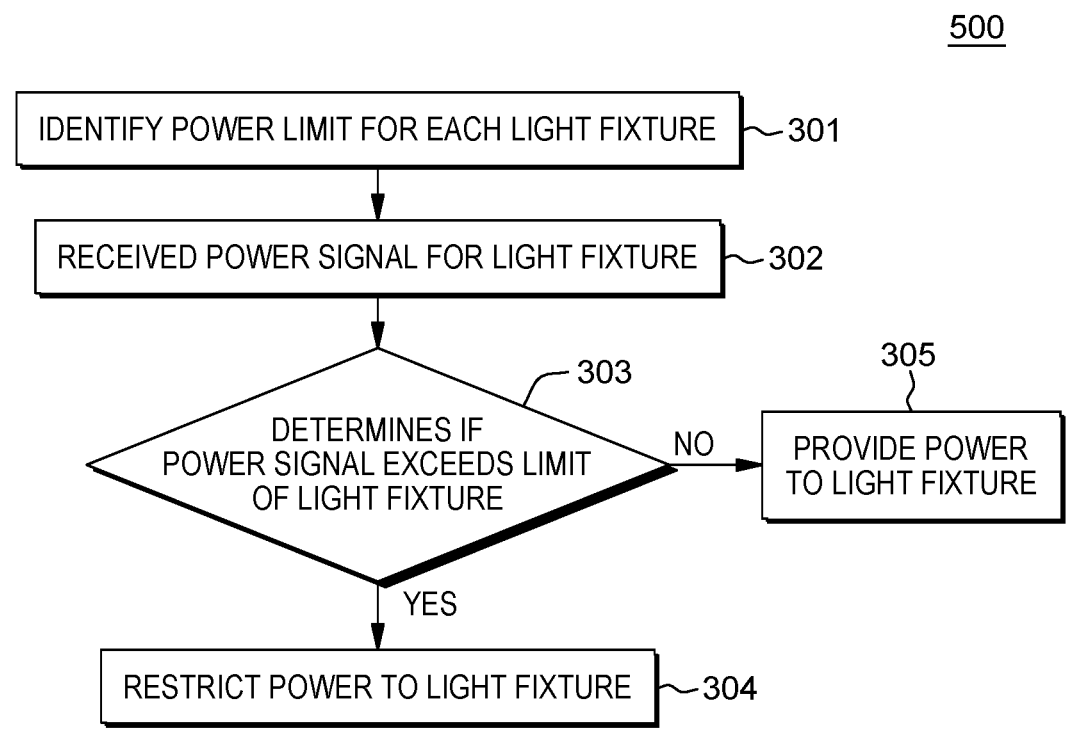
FIG. 5 depicts a flowchart of the operational steps of an exemplary method of monitoring the disclosed PoE system within the PoE environment of FIG. 1, according to an embodiment of the present invention

FIG. 5 shows flowchart 500 depicting a method according to the present invention. The method(s) and associated process(es) are now discussed, over the course of the following paragraphs, in accordance with one embodiment of the present invention. Additionally, steps of the method 600 may be performed in varying orders or concurrently. Furthermore, various steps may be added, subtracted, or combined in the method 600 and still fall within the scope of the present disclosure.

In one example, unless the context indicates otherwise, these steps may be performed by control program 106; however, they may also be performed by suitable hardware or software such as by computing device 103 having suitable logic for implementing these described steps. The method 500 begins at step 301 where a power limit is allocated for each fixture. This may be performed automatically by control program 106, by a user through computing device 103, or through other suitable methods. According to the teachings of the invention, the allocated power limit for each device may include values other than those specified by IEEE, or set by the fixture. After allocation of a power limit for each fixture, power is provided to any fixture sending a power signal request at step 302. The power limit allocated for each device may be stored in the database 108, or in other suitable locations. At decision 303, the power usage is measured for each fixture requesting power. If it is determined that the power exceeds the limit of the fixture at the time, the control program 106, or the like reduces the power supplied to that fixture. If the control program 106 determines that the power does not exceed the limit for the fixture, the control program 106 communicates with the driver to continue supplying the fixture the power 305.

This determination may be based upon an overall power usage determination that occurs independently of this method or may involve specifically determining the power usage for this purpose. Such determination of an overall power usage may involve measuring the overall power usage or measuring power usage for each fixture. This may be implemented in an emergency situation where the power source is nearly depleted of power or the power has been severed and the backup power supply is being used. It may also apply to situations where the fixtures are to be dimmed to accommodate the absence of personnel in the room or building. In some emergency situations the driver can control the various fixtures 107 based on the data received from the sensors 109 to block or lock the people from entering areas of the building which are consumed by fire, gas, smoke, or are otherwise dangerous and direct the people out of the building through a safe and clear path. This can be implemented in different situations and events such as fires, gas leaks, shooters, or the like. In some events the system can be designed to trap or contain individuals who are not permitted to be in the building.

Figure 6:
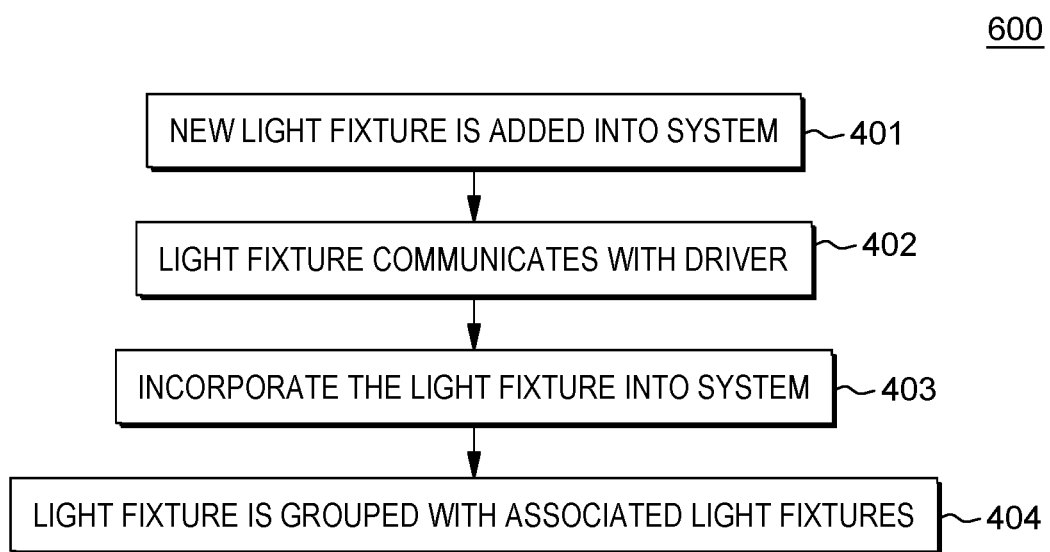
FIG. 6 depicts a flowchart of the operational steps of an exemplary method of integrating additional fixtures into the disclosed PoE system within the PoE environment of FIG. 1, according to an embodiment of the present invention

FIG. 6 shows flowchart 600 depicting a method according to the present invention. The method(s) and associated process(es) are now discussed, over the course of the following paragraphs, in accordance with one embodiment of the present invention. Additionally, steps of the method 600 may be performed in varying orders or concurrently. Furthermore, various steps may be added, subtracted, or combined in the method 600 and still fall within the scope of the present disclosure.

The exemplary method for a sequence that may be deployed by the control program 106 when a new fixture 105 is added to the system 100. The method 600 may be performed by a computing device 103, server 104, or any other computing device with software components of the control program 106. In step 401 a new fixture 105 is added into the system, this may be through physical placement of the fixture and detection by the driver 103, or through a virtual addition of a fixture 105 into the system 100. The new fixture 105 may comprise a new LED light. In step 402, the new fixture communicates with the driver 103 or the control program 106. In an exemplary embodiment, once a new fixture is powered, the new fixture 105 sends a signal to the driver 103 or the control program 106. In step 403, the user, driver 103, or the control program 106 incorporates the light fixture 105 into the system 100. This may include a basic integration into the set of fixtures 105 already incorporated in the system 100 or may be able to automatically group the fixture 105 with similar or associated fixtures 105 in step 404. This process may also be done manually. A user may then access the computing device 103 to locate the new fixture 105. In exemplary embodiments, if the fixture 105 is moved it may need to be reincorporated into the system 100. Each fixture may save its own parameters in non-volatile memory, such that it can resume operation after a power failure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A system for providing power and controlling a plurality of ethernet devices, comprising:
   a driver, wherein the driver provides for the control of the system, and wherein the driver has a capacitor to allow for the driver to maintain a charge, eliminating the plurality of fixtures activation delay;
   a plurality of sensors, wherein the plurality of sensors collect sensor specific data and are in communication with the driver;
   a Power over Ethernet (POE) switch, wherein the POE switch is in communication with the plurality of sensors;
   a plurality of fixtures in communication with the driver and the POE switch, wherein the plurality of fixtures are light sources; and
   a local power source, wherein the local power source is in communication with the POE switch.

2. The system for providing power and controlling a plurality of ethernet devices of claim 1, further comprising,
   a relay, wherein the relay is in communication with the POE switch, and
   an existing building system, in communication with the relay, wherein the relay controls the activation of the existing building system based on commands sent from a control module to the driver, plurality of sensors, or a plurality of switches.

3. The system for providing power and controlling a plurality of ethernet devices of claim 2, further comprising, a local area network, wherein the local area network is in communication with the driver, POE switch, relay, and the plurality of sensors.

4. The system for providing power and controlling a plurality of ethernet devices of claim 3, further comprising, at least one switch, wherein the switch is connected to the local area network and the driver controls the at least one switch.

5. The system for providing power and controlling a plurality of ethernet devices of claim 4, further comprising a plurality of control modules integrated into the driver, plurality of sensors, POE switch, relay, and the local power source, and communicate via the local area network.

6. The system for providing power and controlling a plurality of ethernet devices of claim 1, wherein the local power source is able to activate a series of power modes based on received commands.

7. The system for providing power and controlling a plurality of ethernet devices of claim 1, wherein the driver allows for a constant-current delivery of power via a wired system and control via a wireless system.

8. The system for providing power and controlling a plurality of ethernet devices of claim 1, wherein the plurality of sensors further includes fire and burglary systems.

9. A Power over Ethernet (POE) system, the system comprising:
   a driver, wherein the driver has a control module and the control module is able to send and receive commands;
   a POE switch in communication with the driver, wherein the POE switch sends and receives information from the driver;
   a plurality of sensors in communication with the POE switch, wherein the plurality of sensors send information to the POE switch;
   a plurality of fixtures in communication with the driver and the POE switch, wherein the plurality of fixtures are able to be controlled independently by the POE switch and the driver;

a power source in wired communication with the POE switch, and wherein the control module processes a first set of data received by the plurality of sensors, and generates a set of actions which are sent from the driver to the POE switch to control the plurality of fixtures, and wherein in response to a loss of power, the driver initiating a protocol to send a power and control signal to a group of the plurality of fixtures.

10. The Power over Ethernet (POE) system of claim 9, further comprising, the addition of a new fixture, wherein the driver connects with the new fixture and the control module associates the new fixture with a set of the plurality of fixtures and associates with new fixture with a set of the plurality of sensors.

11. The Power over Ethernet (POE) system of claim 10, further comprising, in response to a signal sent from at least one of the sensors, the POE switch activates a set number of the fixtures.

* * * * *